United States Patent
Qiu et al.

(10) Patent No.: US 8,254,268 B2
(45) Date of Patent: Aug. 28, 2012

(54) METHODS AND APPARATUS TO PERFORM QUALITY TESTING IN INTERNET PROTOCOL MULTIMEDIA SUBSYSTEM BASED COMMUNICATION SYSTEMS

(75) Inventors: Chaoxin Qiu, Austin, TX (US); Alexander Lisheng Huang, Austin, TX (US); Michael Taylor, Leander, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1003 days.

(21) Appl. No.: 12/240,508

(22) Filed: Sep. 29, 2008

(65) Prior Publication Data

US 2010/0083045 A1 Apr. 1, 2010

(51) Int. Cl.
*G01R 31/08* (2006.01)
(52) U.S. Cl. .......................... 370/241; 709/219
(58) Field of Classification Search .............. 370/241, 370/242, 260, 352, 353, 493, 495; 709/219, 709/224, 227; 711/167, 170
See application file for complete search history.

(56) References Cited

U.S. PATENT DOCUMENTS

| | | | |
|---|---|---|---|
| 6,700,953 B1 | | 3/2004 | Maurer et al. |
| 7,099,438 B2 | | 8/2006 | Rancu et al. |
| 7,197,010 B1 | | 3/2007 | Berstein et al. |
| 7,218,895 B1 | | 5/2007 | Raghavan |
| 7,826,443 B1 * | | 11/2010 | Rahman ................... 370/352 |
| 2004/0073658 A1 * | 4/2004 | Oran et al. ............ 709/224 |
| 2004/0190494 A1 | 9/2004 | Bauer |
| 2005/0015253 A1 | 1/2005 | Rambo et al. |
| 2006/0072709 A1 | 4/2006 | Rancu et al. |
| 2006/0153174 A1 | 7/2006 | Towns-von Stauber et al. |
| 2006/0203801 A1 * | 9/2006 | Li et al. ................. 370/241 |
| 2006/0224392 A1 * | 10/2006 | Kershaw et al. ...... 704/270.1 |
| 2007/0287445 A1 | 12/2007 | Logan |
| 2008/0013533 A1 | 1/2008 | Bogineni et al. |
| 2008/0059747 A1 * | 3/2008 | Burckart et al. ........... 711/167 |
| 2008/0095060 A1 * | 4/2008 | Yao ........................ 370/241 |
| 2008/0144602 A1 | 6/2008 | Casey |
| 2008/0162637 A1 | 7/2008 | Adamczyk et al. |
| 2008/0181123 A1 | 7/2008 | Huang et al. |
| 2008/0189774 A1 * | 8/2008 | Ansari et al. .................. 726/7 |
| 2008/0267169 A1 * | 10/2008 | Mundra et al. ........... 370/352 |
| 2009/0100152 A1 * | 4/2009 | Soo et al. ................. 709/219 |

* cited by examiner

*Primary Examiner* — Ricky Ngo
*Assistant Examiner* — Phuongchau B Nguyen
(74) *Attorney, Agent, or Firm* — Hanley, Flight and Zimmerman, LLC (57) ABSTRACT

Methods and apparatus to perform quality testing in Internet Protocol (IP) Multimedia subsystem (IMS) based communication systems are disclosed. An example IMS-based system comprises a web portal to allow a user to configure quality testing for a user endpoint and to present results of the quality testing, a test server to exchange packets with the user endpoint to perform the testing, an IMS application server to implement a state machine to establish a test session between the test server and a test module of the user endpoint, the packets to be exchanged between the test server and the test module via the session, and a data analyzer to determine one or more parameters representative of performance of the session based on the exchanged packets, and to provide the same to the web portal, the web portal to present information representative of the one or more parameters to the user.

20 Claims, 4 Drawing Sheets

METHODS AND APPARATUS TO PERFORM QUALITY TESTING IN INTERNET PROTOCOL MULTIMEDIA SUBSYSTEM BASED COMMUNICATION SYSTEMS

FIELD OF THE DISCLOSURE

This disclosure relates generally to Internet Protocol (IP) Multimedia Subsystem (IMS) based networks and, more particularly, to methods and apparatus to perform quality testing in IMS-based communication systems.

BACKGROUND

There is a general consensus that Next-Generation-Networks (NGNs) will be based on the $3^{rd}$ Generation Partnership Program (3GPP) IMS architecture to provide voice and other communication services via a transmission control protocol (TCP)/Internet protocol (IP) transport infrastructure. The 3GPP IMS architecture is based on a set of open Internet standards (such as session initiation protocol (SIP), H.248, Diameter, G.711, etc.). It is well recognized that quality testing is an important aspect of customer service assurance. Quality testing can include collecting and analyzing technical data (for example, jitter, packet latency, packet loss, etc.), and collecting and analyzing subjective data (for example, a mean opinion score (MOS)).

BRIEF DESCRIPTION OF THE DRAWINGS

Certain examples are shown in the above-identified figures and described in detail below. In describing these examples, like or identical reference numbers may be used to identify common or similar elements.

DETAILED DESCRIPTION

Example methods and apparatus to perform quality testing in Internet Protocol (IP) Multimedia subsystem (IMS) based communication systems are disclosed. A disclosed example IMS-based communication system includes a web portal to allow a user to configure quality testing for a user endpoint communicatively coupled to the IMS-based network, and to present results of the quality testing to the user, a test server to exchange one or more test packets with the user endpoint to perform the quality testing for the user endpoint, an IMS application server responsive to the web portal to implement a call state machine to establish a test communication session between the test server and a quality test module of the user endpoint, the test packets to be exchanged between the test server and the quality test module via the test communication session, and a data analyzer to determine one or more parameters representative of the performance of the test communication session based on the test packets exchanged between the quality test module and the test server, and to provide the one or more parameters to the web portal, the web portal to present information representative of the one or more parameters to the user.

A disclosed example method to implement an IMS application server includes receiving test communication session configuration data from a web-based user portal, operating a session initiation protocol (SIP) state machine to establish a test communication session between a quality test module of a user endpoint and a testing server, and notifying the web-based user portal when quality testing of the user endpoint via the test communication session is complete.

In the interest of brevity and clarity, throughout the following disclosure references will be made to an example IMS-based communication system 100 of FIG. 1. Moreover, the following disclosure will utilize SIP messages and/or SIP message exchanges. However, it should be understood that the methods and apparatus to perform quality testing are applicable to other communication systems and/or networks, other voice over Internet protocol (VoIP) communication systems and/or networks such as those based on soft switches, IMS devices, access networks, IP networks, IMS-based networks and/or communication systems, and/or other types of protocols, messages, and/or message exchanges.

Data collection devices, data analysis devices and quality testing devices currently exist for use in VoIP networks. However, current voice quality test devices and methodologies require manual and/or semi-manual setup, and/or are only accessible to customer care or network operations personnel. As IMS-based communication systems increase in size, network operations and customer care personnel may become overwhelmed by customer service complaints related to, for example, voice quality issues, and may find it difficult to carry out all of the tests necessary to resolves such complaints. Some standards bodies have established and/or defined methodologies for analyzing the quality of communication sessions in IMS-based communication systems. An example quality analysis involves collecting and analyzing data representative of packet jitter, packet latency, packet loss, etc. In particular, some devices support the ability to transport packets using real-time protocol (RTP)/user datagram protocol (UDP), and to exchange key packet performance statistics using RTP control protocol (RTCP). Some methods of subjective evaluation, such as a mean opinion score (MOS), are also commonly used. While such existing technologies may be used to perform quality testing for IMS-based communication systems, such technologies are not amenable to wide-scale deployment and/or for usage within large IMS-based communication systems. Moreover, such approaches are not well suited to diagnose and/or quantify communication session degradations that can occur at anytime and at any of a multitude of access locations.

As will be discussed in more detail below, the example IMS-based communication system 100 of FIG. 1 performs quality testing in a manner that is practical, scalable and manageable in large IMS-based communication systems. The example IMS-based communication system 100 of FIG. 1 includes a web portal 105 having an interface (I/F) module 106, which presents one or more user interfaces that allow a user to configure quality testing for an IMS device, and/or to review the results of quality testing. The example IMS-based communication system 100 also includes one or more voice quality test (VQT) application servers (one of which is designated at reference numeral 110), which are responsible for setting up and tearing down test communication sessions and which are implemented separately from the example web portal 105. By separating the example web portal 105 from the example VQT application server 110, security concerns related to providing users, subscribers and/or enterprise customers an ability to initiate and/or perform quality testing are ameliorated. However, enabling subscribers to perform quality testing for their own IMS device(s) before calling customer care 112 can provide substantial workload relief for network operators 113. The example web portal 105 of FIG. 1 also allows a user to setup and schedule quality testing for a plurality of IMS devices in a batch fashion.

Figure 1:
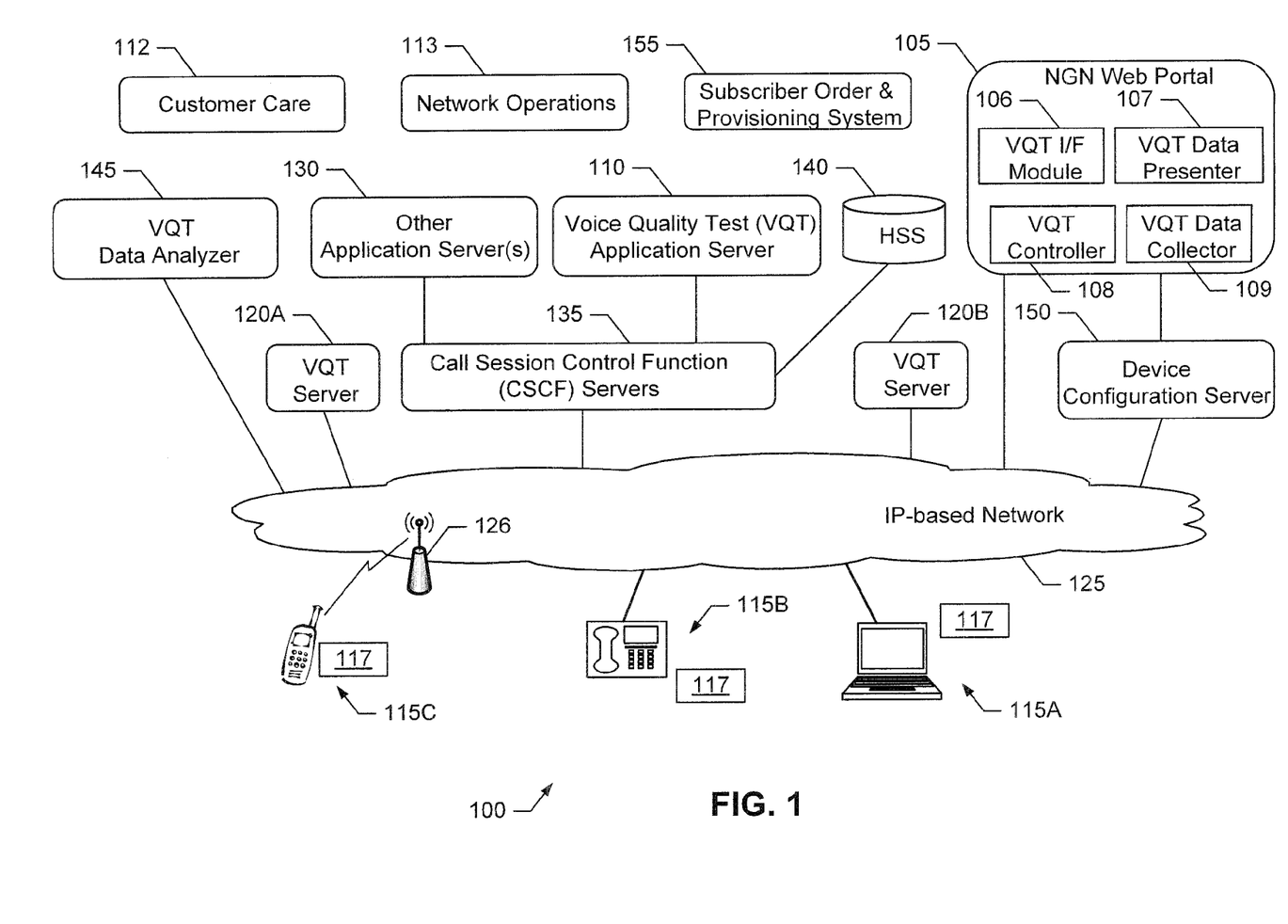
FIG. 1 is a schematic illustration of an example IMS-based communication system constructed in accordance with the teachings of this disclosure.

The example IMS-based communication system 100 of FIG. 1 includes any number and/or type(s) of IMS devices, three of which are designated at reference numerals 115A-C. To perform quality testing, each of the example IMS devices 115A-C of FIG. 1 implements a quality test module 117 that is designed to operate to be imperceptible and/or undetectable by users and/or subscribers of the IMS devices 115A-C. For example, performance testing can be deferred for an IMS device 115A-C while the IMS device 115A-C is involved in an active communication session, a test communication session may be aborted if a non-test communication session is initiated, and/or a test communication session request not be accepted when the IMS device 115A-C does not have adequate bandwidth to support the requested test communication session. In some examples, a test communication session is not accepted by a quality test module 117 when the most recent test communication session was completed less than an hour ago.

As described in more detail below in connection with FIG. 2, the example quality test modules 117 of FIG. 1 are responsive to the example VQT application server 110. As directed by the example VQT application server 110, a quality test module 117 can establish a test communication session with one of one or more VQT servers (two of which are designated at reference numerals 120A and 120B), which are deployed within the IMS-based communication system 100 for the purposes of performing quality testing for the IMS devices 115A-C. A particular IMS device 115A-C and a particular VQT server 120A-B of FIG. 1 perform quality testing for the IMS device 115A-C by exchanging test packets and/or test information using, for example, RTP, UDP and/or RTCP.

The example quality test modules 117 of FIG. 1 only accept test communication sessions initiated by the example VQT application server 110. As such, each of the quality test modules 117 is not assigned an E.164 telephone number that is routable in a public switched telephone network (PSTN) system or a public land mobile network (PLMN) system. Instead, each quality test module 117 is assigned a SIP uniform resource identifier (URI) that is only routable within the example IMS-based communication system 100. In some examples, the quality test module 117 of a particular IMS device 115A-C is automatically provisioned and/or configured when the IMS device 115A-C is provisioned and/or configured to implement a conventional service.

Each of the example VQT servers 120A and 120B of FIG. 1 implements, among other things, a SIP user agent (UA) module (not shown) that allows the VQT server 120A-B to serve as terminating endpoint for a test communication session via which quality testing may be performed for a particular IMS device 115A-C. The number and/or location(s) of the VQT servers 120A and 120B may depend on any number of criteria. For example, locations for the VQT servers 120A and 120B may be selected based on the network topology of the IMS-based communication system 100.

Example IMS devices 115A-C include, but are not limited to, an IMS-based phone, a VoIP phone, an IMS residential gateway (RG), an IMS-enabled personal computer (PC), an IMS endpoint, a wireless IMS device such as a wireless-fidelity (WiFi) Internet protocol (IP) phone, an IMS adapter such as an analog telephone adapter (ATA), an IMS-enabled personal digital assistant (PDA), and/or an IMS kiosk. The example IMS devices 115A-C of FIG. 1 may be implemented and/or found at any number and/or type(s) of locations. Further, the IMS devices 115A-C may be fixed location devices, substantially fixed location devices and/or mobile devices. Moreover, the IMS devices 115A-C may have equipment communicatively and/or electrically coupled to them. For example, an IMS ATA may be coupled to a telephone, and/or an IMS residential gateway may be coupled to a PC and/or set-top box.

To couple the example IMS devices 115A-C to other elements of the example IMS-based communication system 100, the communication system 100 includes any number and/or type(s) of public and/or private IP-based networks (one of which is designated at reference numeral 125) such as the Internet. The example IP-based network 125 of FIG. 1 can be implemented using any number and/or type(s) of past, present and/or future standards, specifications, communication devices, networks, technologies and/or systems, such as Institute of Electrical and Electronics Engineers (IEEE) 802.16x (a.k.a. WiMax) systems, PSTN systems, PLMN systems such as a cellular system, wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

The example IMS devices 115A-C of FIG. 1 are communicatively coupled to the example IP-based network 125 via any number and/or type(s) of past, current and/or future communication network(s), communication system(s), communication device(s), transmission path(s), protocol(s), technique(s), specification(s) and/or standard(s). For instance, the example IMS devices 115A-C may be coupled to the example IP-based network 125 via any type(s) of voice-band modem(s), digital subscriber line (DSL) modem(s), cable modem(s), Ethernet transceiver(s), optical transceiver(s), IP virtual private network (VPN) connection(s), IEEE 802.11x (a.k.a. WiFi) transceiver(s), IEEE 802.16 transceivers, wireless local area network (WLAN) access point(s), general packet radio services (GPRS) networks in 3G wireless networks, etc. Moreover, the example IP-based network 125 of FIG. 1 may extend geographically to include one or more locations near to and/or encompassing one or more of the IMS devices 115A-C. For example, the IP-based network 125 may include a wireless access point 126 by which, for example, a WiFi IP phone 115C connects to the IP-based network 125 or a wireless base station (not shown). Further still, the example IMS devices 115A-C of FIG. 1 may be communicatively coupled to the IP-based network 125 via one or more additional IP-based networks and/or devices (not shown), such as a local area network (LAN), a gateway and/or a router located within a place of business, a school and/or a residence.

To implement call session processing functions, the example IMS-based communication system 100 of FIG. 1 includes any number and/or type(s) of call session control function (CSCF) servers, which are represented collectively a reference numeral 135. Example CSCF servers include a proxy-CSCF (P-CSCF) server, an interrogating-CSCF (I-CSCF) server and a serving-CSCF (S-CSCF) server. The example CSCF servers 135 of FIG. 1 may be implemented in accordance with any past, present and/or future standard, specification and/or recommendation.

To manage subscriber information, and/or to enable subscribers and/or servers to locate other servers, subscribers and/or destinations, the example IMS-based communication system 100 of FIG. 1 includes any number and/or type(s) of home subscriber server(s) (HSSs), one of which is designated at reference numeral 140. The example HSS 140 of FIG. 1 maintains a device profile and/or configuration, and/or one or more preferences for each subscriber and/or IMS device 115A-C. The example VQT application server 110 of FIG. 1 can use information stored in the HSS 140 to, for example, obtain the SIP URI associated with the quality test module 117 of a particular IMS device 115A-C.

To determine the performance of a test communication session, the example IMS-based communication system 100 of FIG. 1 includes a VQT data analyzer 145. The example VQT data analyzer 145 of FIG. 1 is an IMS signaling and media analysis probe that is able to collect raw SIP protocol messages and RTP/RTPC packets from the IMS-based communication system 100. The example VQT data analyzer 145 organizes and/or correlates the packets from disparate communication sessions into records that each represent a specific communication session. For a particular communication session, the example VQT data analyzer 145 analyses the collected protocol and/or media packets to determine one or more quality metrics representative of the quality of the communication session. The example VQT data analyzer 145 of FIG. 1 stores the determined quality metrics in semi-permanent storage for subsequent retrieval by the example web portal 105 and/or network operations personnel 113.

In the illustrated example of FIG. 1, the VQT data analyzer 145 is depicted separately from the example VQT servers 120A and 120B. However, in some examples, a VQT data analyzer 145 may implement a VQT server 120A-B.

To present one or more user interfaces, the example web portal 105 of FIG. 1 includes the VQT I/F module 106. The example VQT I/F module 106 of FIG. 1 presents one or more web-based graphical user interfaces (GUI) that allow a user of the example web portal 105 to configure quality testing for one or more of the IMS devices 115A-C. The example VQT I/F module 106 also receives quality test results from a VQT data presenter 107, which the VQT I/F module 106 presents to the user via a potentially different GUI.

To control quality testing for the IMS devices 115A-C, the example web portal 105 of FIG. 1 includes a VQT controller 108. The example VQT controller 108 of FIG. 1 receives test configuration information from the VQT I/F module 106. In response to configuration information for a test communication session, the example VQT controller 108: (a) directs the example VQT application server 110 to establish a corresponding test communication session, (b) directs the VQT data analyzer 145 to collect information related to the performance of the test communication session, and (c) notifies a VQT data collector 109 when the testing is complete.

When quality testing for an IMS device 115A-C is complete, the example VQT data collector 109 of FIG. 1 collects the performance metrics for the configured test communication session from the example VQT data analyzer 145. The example VQT data presenter 107 of FIG. 1 manipulates the performance metrics collected by the VQT data collector 109 into a form suitable for presentation to the user by the example VQT I/F module 106.

Figure 4:
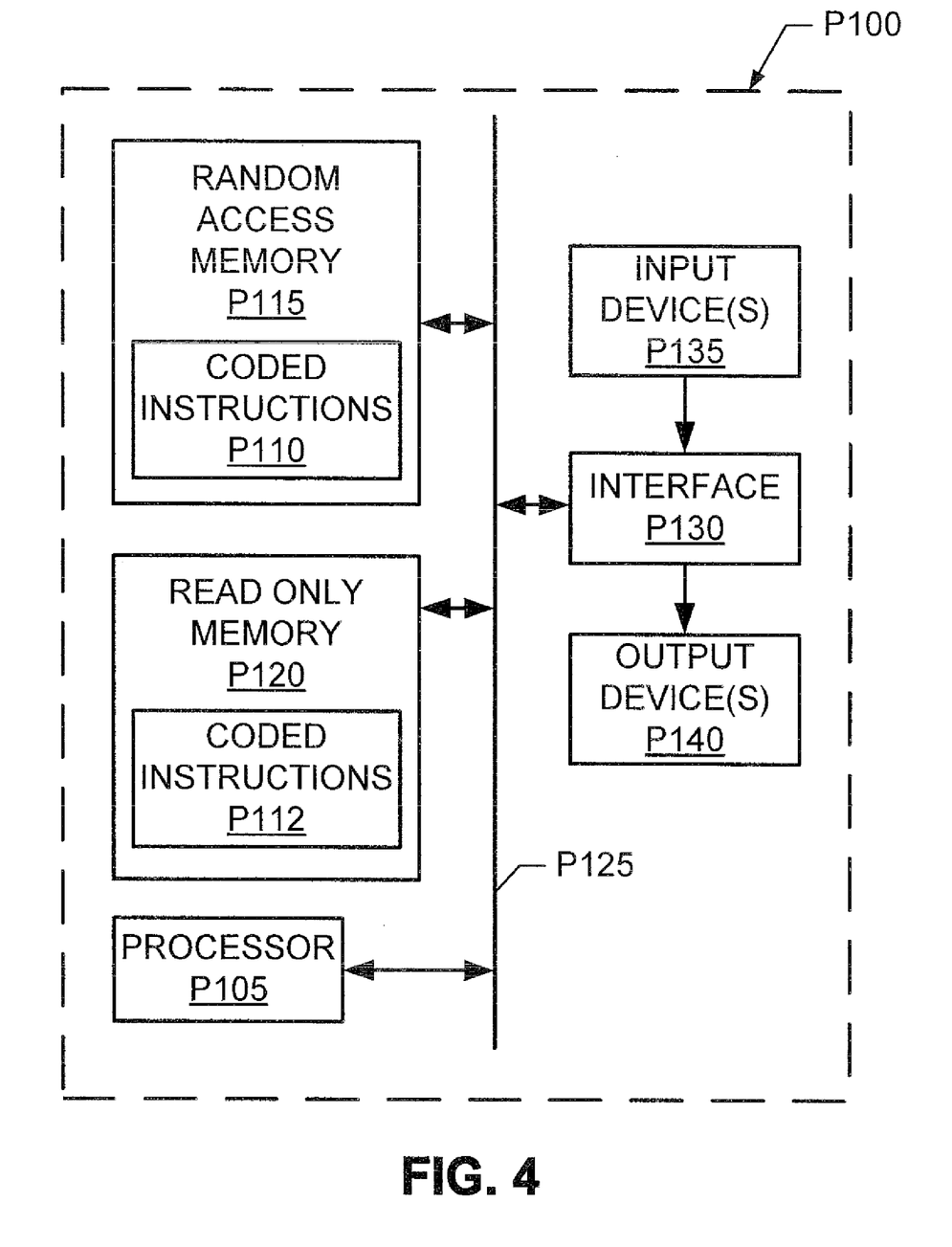
FIG. 4 is a schematic illustration of an example processor platform that may be used and/or programmed to carry out the example exchanges and/or the example processes of FIG. 2 and/or 3, and/or to implement any or all of the example methods and apparatus described herein.

In some examples, the example VQT I/F module 106, the example VQT data presenter 107, the example VQT controller 108 and the example VQT data collector 109 are implemented by a single processor platform such as the example processor platform P100 of FIG. 4. However, the VQT I/F module 106, the VQT data presenter 107, the VQT controller 108 and the VQT data collector 109 may be implemented using any number of processor platforms. Moreover, while a single web portal 105 is depicted in FIG. 1, any number of web portals 105 may be implemented.

To provide configuration data and/or information to the example IMS devices 115A-C, the example IMS-based communication system 100 of FIG. 1 includes a device configuration server 150. When the example device configuration server 150 of FIG. 1 receives device configuration information for a particular IMS device 115A-C from a subscriber order and provisioning system 155, the device configuration server 150 sends the device configuration information to the IMS device 115A-C via the IP-based network 125.

In addition to providing IMS device configuration information to the device configuration server 150, the example subscriber order and provisioning system 155 of FIG. 1 stores the device configuration information in the example HSS 140 for subsequent retrieval by other servers and/or systems of the example IMS-based communication system 100.

To provide one or more additional call features, the example IMS-based communication system 100 of FIG. 1 includes any number and/or type(s) of additional application servers, one of which are designated at reference numeral 130. The example application server 130 of FIG. 1 provides and/or implements additional service features to calling and/or called parties. Example service features includes, but are not limited to, call barring, calling name delivery and/or blocking, call blocking, call forward, call forking, call trace, voicemail, announcement servers, call trees, etc.

While an example IMS-based communication system 100 has been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example web portal 105, the example VQT I/F module 106, the example VQT data presenter 107, the example VQT controller 108, the example VQT data collector 109, the example VQT application server 110, the example VQT servers 120A-B, the example application server(s) 130, the example CSCF servers 135, the example HSS 140, the example VQT data analyzer 145, the example device configuration server 150, and the example subscriber order and provisioning system 155 illustrated in FIG. 1 are logical entities of the example IMS-based communication system 100. They may, therefore, be implemented separately and/or in any combination using, for example, machine accessible instructions executed by one or more computing devices and/or computing platforms such as the example processing platform P100 of FIG. 4. Further, the example web portal 105, the example VQT I/F module 106, the example VQT data presenter 107, the example VQT controller 108, the example VQT data collector 109, the example VQT application server 110, the example VQT servers 120A-B, the example application server(s) 130, the example CSCF servers 135, the example HSS 140, the example VQT data analyzer 145, the example device configuration server 150, and/or the example subscriber order and provisioning system 155, and/or, more generally, the example IMS-based communication system 100 may be implemented by hardware, software, firmware and/or any combination of hardware, software and/or firmware. Thus, for example, any or the example web portal 105, the example VQT I/F module 106, the example VQT data presenter 107, the example VQT controller 108, the example VQT data collector 109, the example VQT application server 110, the example VQT servers 120A-B, the example application server(s) 130, the example CSCF servers 135, the example HSS 140, the example VQT data analyzer 145, the example device configuration server 150, the example subscriber order and provisioning system 155, and/or, more generally, the example IMS-based communication system 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example web portal 105, the example VQT I/F module 106, the example VQT data presenter 107, the example VQT controller 108, the example VQT data collector 109, the example VQT application server 110, the example VQT servers 120A-B, the example application server(s) 130, the example CSCF servers 135, the example HSS 140, the example VQT data analyzer 145, the example device configuration server 150, the example subscriber order and provisioning system 155, and/or, more generally, the example IMS-based communication system 100 are hereby expressly defined to include a tangible medium such as a memory, a digital versatile disc (DVD), a compact disc (CD), etc. storing the firmware and/or software. Further still, an IMS-based communication system may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
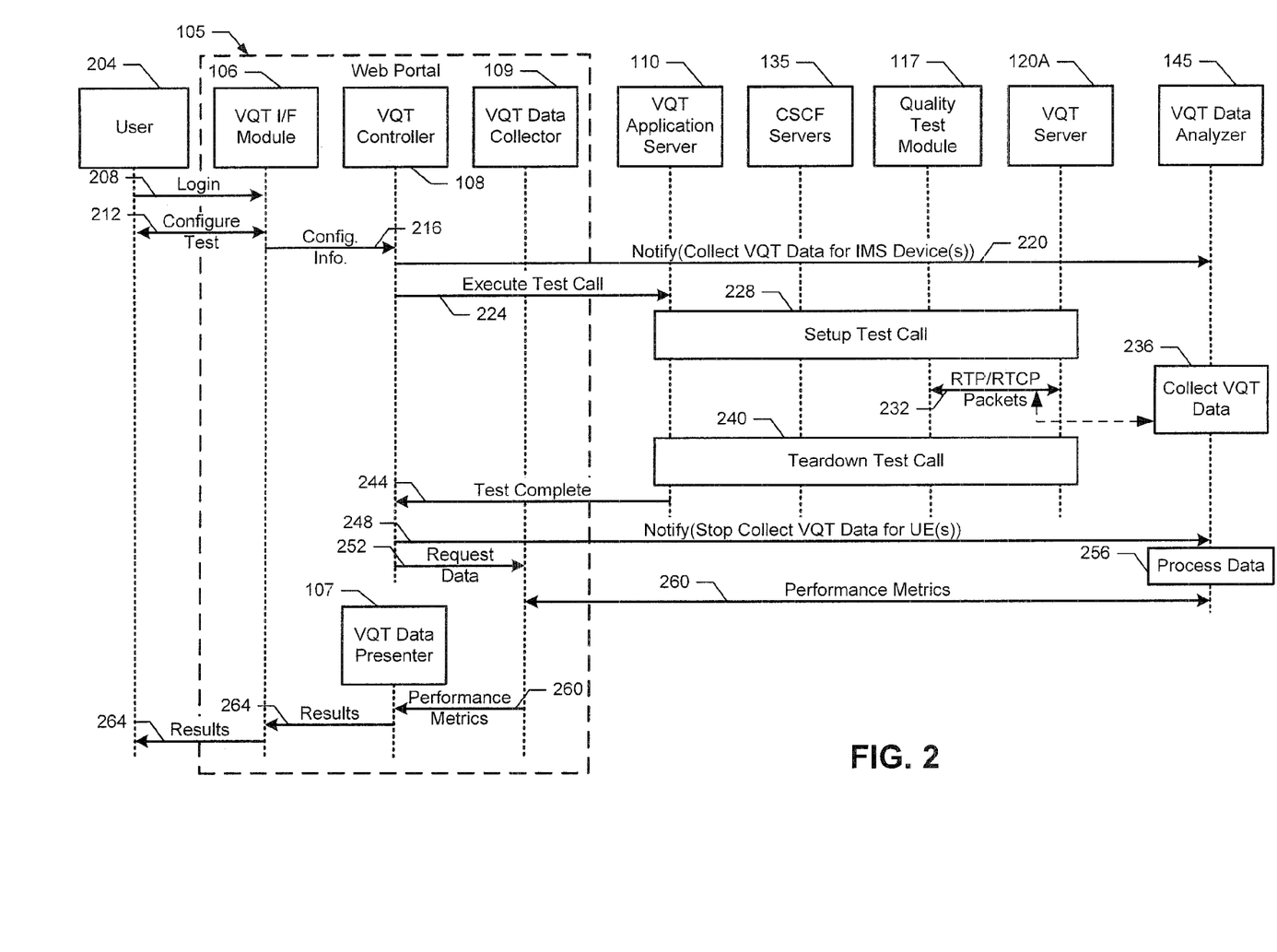
FIGS. 2 and 3 illustrate example protocol message exchanges, and flowcharts representative of example processes that may be executed to implement the example IMS-based communication system of FIG. 1.
Figure 3:
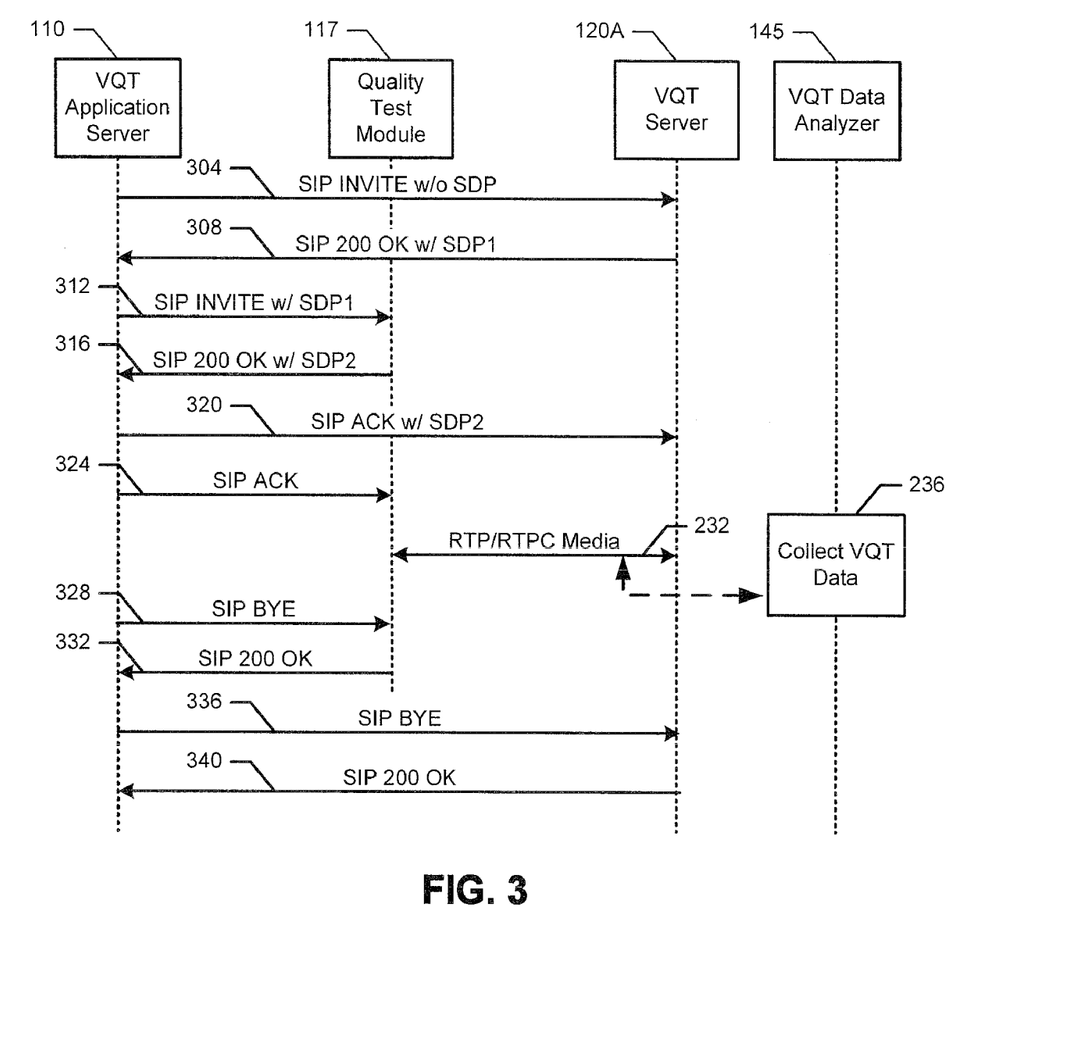

FIGS. 2 and 3 illustrate example protocol message exchanges, and flowcharts representative of example processes that may be executed to implement the example IMS-based communication system 100 of FIG. 1. The example exchanges and/or the example processes of FIGS. 2 and/or 3 may be carried out by a processor, a controller and/or any other suitable processing device. For example, the example exchanges and/or the example processes of FIGS. 2 and/or 3 may be embodied in coded and/or machine-accessible instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general-purpose or special-purpose computer, or other machine with a processor such as the example processor platform P100 discussed below in connection with FIG. 4. Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example exchanges and/or the example processes of FIGS. 2 and/or 3 may be implemented using any combination(s) of ASIC(s), PLD(s), FPLD(s), discrete logic, hardware, firmware, etc. Also, some or all of the example exchanges and/or the example processes of FIGS. 2 and/or 3 may instead be implemented manually or as any combination of any of the foregoing techniques, for example, any combination of firmware, software, discrete logic and/or hardware. Further, many other methods of implementing the example operations of FIGS. 2 and/or 3 may be employed. For example, the order of execution of the blocks may be changed, and/or one or more of the blocks described may be changed, eliminated, sub-divided, or combined. Additionally, any or all of the example exchanges and/or the example processes of FIGS. 2 and/or 3 may be carried out sequentially and/or carried out in parallel by, for example, separate processing threads, processors, devices, discrete logic, circuits, etc.

The example exchanges and the example processes of FIG. 2 begin with a user 204 logging into the example VQT I/F module 106 (FIG. 1), as depicted by line 208. The user 204 uses one or more GUIs presented by the VQT I/F module 106 to configure 212 quality testing for one or more IMS devices 115A-C. For ease of discussion, in the illustrated example of FIG. 2 the user 204 configures 212 quality testing for a single IMS device 115A-C. When the user 204 is done configuring 212 the quality testing, the VQT I/F module 106 provides configuration information 216 for the configured test communication session to the example VQT controller 108. Additionally or alternatively, test communication sessions may be configured by uploading and/or otherwise providing the VQT I/F module 106 a data file that specifies test communication sessions for one or more IMS devices 115A-C In response to the test configuration information 216, the example VQT controller 108 notifies 220 the VQT Data Analyzer 145 to start collecting protocol messages and/or exchanged packets for the configured test communication session. The VQT controller 108 also directs 224 the example VQT application server 110 to setup and initiate the configured test communication session.

In response to the direction 224 provided by the VQT controller 108, the example VQT application server 110 interacts with the CSCF servers 135, the example quality test module 117 and the example VQT server 120A to setup a test communication session (block 228). Example protocol message exchanges, and flowcharts representative of example processes that may be executed to set up the test communication session are illustrated in FIG. 3.

When the test communication session is established (block 228), the quality test module 117 and the VQT server 120A exchange RTP/RTCP packets 232. While the RTP/RTCP packets 232 are being exchanged, the example VQT Data Analyzer 145 collects the exchanged packets 232 (block 236). When the test communication session is ended, the example VQT application server 110 interacts with the CSCF servers 135, the example quality test module 117 and the example VQT server 120A to teardown the test communication session (block 240). In some examples, the test communication session has a predetermined length and/or continues until a predetermined number of RTP/RTCP packets 232 are exchanged. Example protocol message exchanges, and flowcharts representative of example processes that may be executed to tear down the test communication session are illustrated in FIG. 3.

When the test communication session is torn down (block 240), the VQT application server 110 notifies 244 the VQT controller 108 that quality testing is complete. The VQT controller 108 notifies 248 the VQT data analyzer 145 to stop collecting data. The VQT controller 108 also notifies 252 the VQT data collector 109 to collect performance data from the VQT data analyzer 145.

When data collection is stopped, the VQT data analyzer 145 processes the collected data to determine or compute one or more performance metrics representative of the quality of the test communication session (block 256).

When notified 252 by the VQT controller 108 that quality testing is complete, the example VQT data collector 109 collects, requests and/or otherwise obtains the performance metrics 260 computed by the VQT data analyzer 145. The VQT data collector 109 provides the performance metrics 260 to the example VQT data presenter 107.

The example VQT data presenter 107 manipulates the performance metrics 260 provided by the VQT data collector 109 into results 264 that are suitable for presentation to the user 204 by the example VQT I/F module 106.

For ease of discussion and illustration, a single test communication session is depicted in FIG. 2. However, the user 204 may configure testing for more than one IMS device 115A-C and/or testing of an IMS device 115A-C against more than one VQT servers 120A-B. In such instances, applicable portions of the example exchanges of FIG. 2 are carried out for each of the configured test communication sessions, with the various instances of the exchanges carried out serially and/or in parallel. In some examples, the user 204 configures a time at which each of the test communication session is to be performed. For instance, a user (e.g., an administration staff person) may configure and schedule a sequence of one or more tests to start at a later time (e.g., tonight at 1:00 am). In another example, a communication session is rejected by quality test module 117 since the owner of the IMS device 115A-C is engaged in conversation, and the VQT controller 108 automatically re-schedules the test for a later time.

For ease of discussion and illustration, the example CSCF servers 135 of FIGS. 1 and 2 are not depicted in FIG. 3. However, persons of ordinary skill in the art will readily appreciate that some or all of the example SIP messages shown in FIG. 2 will be processed and/or handled by one or more of the CSCF servers 135 in accordance with any past, present and/or future SIP standard, specification and/or recommendation.

The example exchanges and the example processes of FIG. 3 begin with the example VQT application server 110 sending a SIP INVITE message 304 to the example VQT server 120A. In the illustrated example of FIG. 3, the VQT server 120A responds with a SIP 200 OK message 308 indicating that it can accept the requested test communication session. When the SIP 200 OK message 308 is received, the VQT application server 110 sends a SIP INVITE message 312 to the quality test module 117. The quality test module 117 likewise responds with a SIP 200 OK message 316 indicating that it can accept the requested test communication session. If the quality test module 117 were not able to accept the request test communications, it would respond with a SIP 480 message having a Retry_after header that indicates how long the VQT application server 110 should wait before reattempting to setup the test communication session.

When the SIP 200 OK message 316 is received, the VQT application server 110 sends a SIP ACK message 320 to the VQT server 120A and a SIP ACK message 324 to the quality test module 117. When the SIP ACK messages 320 and 324 are received by the VQT server 120A and the quality test module 117, respectively, the VQT server 120A and the quality test module 117 exchange RTP/RTCP packets 232. While the RTP/RTCP packets 232 are being exchanged, the example VQT Data Analyzer 145 collects the exchanged packets 232 (block 236). In some examples, the test communication session continues for a predetermined length of time and/or continues until a predetermined number of RTP/RTCP packets 232 have been exchanged.

In the illustrated example of FIG. 1, the quality test module 117 includes in the example SIP 200 OK message 316 a session descriptor SDP2 that differs from the session descriptor SDP1 provided by the VQT server 120A in the example SIP 200 OK message 308. Thus, the example SIP ACK message 320 contains the session descriptor SDP2 indicating to the VQT server 120A that the session descriptor SDP1 proposed by the VQT server 120A was not accepted by the quality test module 117 and, instead, the quality test module 117 proposes a different session descriptor SDP2. Such an exchange of session descriptors illustrates an example method of negotiating media characteristics during call setup.

When the test communication session is complete, the example VQT application server 110 sends a SIP BYE message 328 to the quality test module 117, which responds with a SIP 200 OK message 332. Likewise, the VQT application server 110 sends a SIP BYE message 336 to the VQT server 120A and receives a SIP 200 OK message 340 in response.

FIG. 4 is a schematic diagram of an example processor platform P100 that may be used and/or programmed to implement the example web portal 105, the example VQT I/F module 106, the example VQT data presenter 107, the example VQT controller 108, the example VQT data collector 109, the example VQT application server 110, the example VQT servers 120A-B, the example application server(s) 130, the example CSCF servers 135, the example HSS 140, the example VQT data analyzer 145, the example device configuration server 150, the example subscriber order and provisioning system 155, and/or, more generally, the example IMS-based communication system 100 of FIGS. 1-3. For example, the processor platform P100 can be implemented by one or more general-purpose processors, special-purpose processors, processor cores, microcontrollers, etc.

The processor platform P100 of the example of FIG. 4 includes at least one general-purpose programmable processor P105. The processor P105 executes coded instructions P110 and/or P112 present in main memory of the processor P105. For example, the coded instructions P110 and/or P112 may be stored within a RAM P115 and/or a ROM P117. The processor P105 may be any type of processing unit, such as a processor core, a processor and/or a microcontroller. The processor P105 may execute, among other things, the example protocol exchanges and/or the example processes of FIGS. 2 and/or 3 to implement the example methods and apparatus described herein.

The processor P105 is in communication with the main memory (including a ROM P117 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P117 may be controlled by a memory controller (not shown). The example memory P115 may be used to implement the example HSS 140 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement interfaces between and/or among any or all of the example devices, servers and/or systems of FIG. 1.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An Internet protocol Multimedia Subsystem (IMS) based communication system comprising:
a web portal to present a user interface to allow a user to configure quality testing for a user endpoint communicatively coupled to an IMS-based network, and to present results of the quality testing to the user;
a test server to exchange one or more test packets with the user endpoint to perform the quality testing for the user endpoint;
an IMS application server responsive to the web portal to implement a call state machine to establish a test communication session between the test server and a quality test module of the user endpoint, the test packets to be exchanged between the test server and the quality test module via the test communication session; and
a data analyzer to determine one or more parameters representative of the performance of the test communication session based on the test packets exchanged between the quality test module and the test server, and to provide the one or more parameters to the web portal, the web portal to present information representative of the one or more parameters to the user.

2. An IMS-based communication system as defined in claim 1, wherein the web portal comprises:
an interface module to present the user interface to allow the user to configure the quality testing by identifying the user endpoint;
a test controller to direct the IMS application server to establish the test communication session;
a data collector to obtain the one or more parameters from the data analyzer; and
a data presenter to manipulate the one or more parameters for presentation to the user by the interface module.

3. An IMS-based communication system as defined in claim 2, wherein the user interface is to allow the user to configure when the quality testing for the user endpoint is to be performed.

4. An IMS-based communication system as defined in claim 2, wherein the user interface is to allow the user to configure quality testing for one or more additional user endpoints.

5. An IMS-based communication system as defined in claim 1, wherein the user is at least one of a subscriber of the IMS based network, a customer care representative, a network operation staff person, or a technician.

6. An IMS-based communication system as defined in claim 1, wherein the IMS application server uses a session initiation protocol to establish the test call.

7. An IMS-based communication system as defined in claim 1, further comprising a provisioning system to provision the quality test module of the user endpoint with a service profile responsive to the IMS application server for the test call.

8. An IMS-based communication system as defined in claim 7, wherein the service profile is not associated with a publicly routable telephone number.

9. An IMS-based communication system as defined in claim 1, wherein the quality test module of the user endpoint is to establish the test call and exchange the packets with the test server in manner that is not user discernable.

10. An IMS-based communication system as defined in claim 1, wherein the packets are constructed in accordance with at least one of a real-time transport protocol (RTP) or an RTP control protocol.

11. An IMS-based communication system as defined in claim 1, wherein the IMS application server is to delay the test call when the user endpoint is active in a communication session.

12. An IMS-based communication system as defined in claim 1, wherein the IMS-based network is implemented to secure the IMS-based network by allowing the user access to the web portal but not to at least one of the test server, the IMS application server or the data analyzer.

13. An IMS-based communication system as defined in claim 1, wherein the IMS application server is implemented separately from the web portal.

14. An IMS-based communication system as defined in claim 1, wherein the quality test module accepts the test communication session only if initiated by the IMS application server.

15. An IMS-based communication system as defined in claim 1, wherein the quality testing is configured by providing a data file that specifies a test communication session for the user endpoint to the web portal.

16. An IMS-based communication system as defined in claim 1, wherein the test communication session is implemented between the quality test module and one or more additional test servers.

17. An IMS-based communication system as defined in claim 1, wherein the web portal automatically reschedules the quality testing if the test communication session is rejected by the quality test module of the user endpoint.

18. An IMS-based communication system as defined in claim 1, wherein the test server and the quality test module exchange session descriptor packets during the establishment of the test communication session, the session descriptor packets representative of media characteristics.

19. An Internet protocol Multimedia Subsystem (IMS) based communication system comprising:
a web portal to allow a subscriber to configure quality testing for a subscriber device communicatively coupled to an IMS-based network, and to present results of the quality testing to the subscriber;
an IMS application server to implement a test communication session to perform the quality testing for the subscriber device;
a test server to exchange one or more test packets with a quality test module implemented by the subscriber device during the test communication session; and
a data analyzer to determine one or more parameters representative of the performance of the test communication session based on the test packets exchanged between the quality test module and the test server, and to provide the one or more parameters to the web portal, the web portal to present information representative of the one or more parameters to the subscriber.

20. An Internet protocol Multimedia Subsystem (IMS) based communication system comprising:
a web portal to present a user interface to allow a user to configure quality testing for a user endpoint communicatively coupled to an IMS-based network, and to present results of the quality testing to the user;
an IMS application server to implement a test communication session to perform the quality testing for the user endpoint;
a test server to exchange one or more test packets with a quality test module implemented by the user endpoint during the test communication session; and
a data analyzer to determine one or more parameters representative of the performance of the test communication session based on the test packets exchanged between the quality test module and the test server, and to provide the one or more parameters to the web portal, the web portal to present information representative of the one or more parameters to the user via the user interface.

* * * * *